United States Patent [19]

Ahn

[11] Patent Number: 5,742,127
[45] Date of Patent: Apr. 21, 1998

[54] DEGAUSSING SYSTEM FOR CATHODE RAY TUBE WHICH PREVENTS DISPLAY OF VISUAL DISTORTION

[76] Inventor: Jong Ki Ahn, Jindalae Apt. 201, 125-6, Hyungkok-Dong, Kumi, Kyungsangbook-Do, Rep. of Korea

[21] Appl. No.: 582,926

[22] Filed: Jan. 4, 1996

[30] Foreign Application Priority Data

Dec. 7, 1995 [KR] Rep. of Korea ............... 1995/47366

[51] Int. Cl.⁶ .................................................. H04N 9/29
[52] U.S. Cl. ................................................ 315/8; 361/150
[58] Field of Search ............................. 315/8; 361/150

[56] References Cited

U.S. PATENT DOCUMENTS

| | | | |
|---|---|---|---|
| 4,445,072 | 4/1984 | Fredes | 361/150 X |
| 4,458,178 | 7/1984 | Tenney et al. | 315/8 |
| 4,636,911 | 1/1987 | Truskalo | 315/8 X |
| 5,475,283 | 12/1995 | Yoshida | 315/8 |
| 5,499,156 | 3/1996 | Bentley | 315/8 X |

FOREIGN PATENT DOCUMENTS

| | | |
|---|---|---|
| 1269162 | 12/1969 | Germany. |
| 3127299 | 3/1983 | Germany. |
| 0391032 | 10/1990 | Germany. |

*Primary Examiner*—Robert Pascal
*Assistant Examiner*—Justin P. Bettendorf

[57] ABSTRACT

A system for degaussing a cathode ray tube (CRT) which avoids displaying a distorted picture to the user when a magnetic field is degaussed while the CRT is on. The system of the present invention recognizes when a user has pressed a button to initiate the manual degaussing operation, controls the brightness and contrast of the CRT so that the displayed picture becomes black, degausses the CRT while the picture appears black, and controls the brightness and contrast of the CRT to levels present before degaussing.

10 Claims, 4 Drawing Sheets

DEGAUSSING SYSTEM FOR CATHODE RAY TUBE WHICH PREVENTS DISPLAY OF VISUAL DISTORTION

BACKGROUND OF THE INVENTION

1. Field of the Invention

The present invention relates to a degaussing method for a cathode ray tube (CRT), and in particular to an improved degaussing method for a CRT capable of preventing a visual distortion caused when a remaining magnetic field is manually degaussed in a state that the CRT is turned on.

2. Description of the Conventional Art

FIG. 1 shows a conventional degaussing circuit construction, which includes a button BT one end of which is connected to the ground, a capacitor C having one end connected to the button BT and the other end connected to the ground for charging as a certain voltage current Vcc is applied thereto through a resistance R, a transistor Q turned on/off in accordance with voltage outputted from the capacitor C, a switch S/W switched in accordance with an operation of the transistor Q, a PTC (positive temperature coefficient) for restricting alternating current applied thereto from a plug PLG in accordance with a switching operation of the switch S/W, a coil 20, wound onto the CRT 10, to which alternating current is applied, and a rectifier 30 for rectifying alternating current applied thereto from the plug PLG.

The operation of the conventional degaussing circuit will now be explained with reference to the accompanying drawings.

To begin with, when electric power is supplied to the CRT in a state that the CRT is turned on, since voltage charged in the capacitor C, as shown in FIG. 2A, is zero volt, the transistor Q is turned on. The current Ic of the voltage Vcc, as shown in FIG. 2B, is supplied to the collector of the transistor Q through the coil of the switch S/W, so that the switch S/W is connected. Here, the voltage VT is the threshold voltage of the transistor Q.

Alternating current flows to the PTC and the degaussing coil 20 through the alternating current plug PLG, and the remaining magnetic field of the CRT is degaussed.

Although the PTC initially has a relatively small resistance value, as time is lapsed, heat is generated at the PTC, and the PTC has a relatively larger resistance. After a certain time is lapsed, alternating current, as shown in FIG. 2C, is not supplied to the degaussing coil 20. Thereafter, the capacitor C is charged due to the current applied thereto up to Vcc, the transistor Q is automatically turned off, the switch S/W is disconnected, and alternating current voltage is blocked from flowing to the PTC.

Thereafter, when a user presses the button, the manual degaussing operation is performed. That is, when the button BT is pressed as shown in FIG. 3A, the voltage charged in the capacitor C is discharged. The transistor Q is turned on as shown in FIG. 3B, and the switch S/W is disconnected. At this time, since the PTC has a relatively low resistance value, alternating current voltage flows to the degaussing coil 20, and as time is lapsed, heat is generated at the PTC, and alternating current voltage flowing to the degaussing coil 20, as shown in FIG. 3C, is decreased.

That is, when the button BT is pressed, a degaussing operation is performed for a certain time, and the remaining magnetic field is regenerated at the CRT 10.

When the CRT is initially turned on, the degaussing operation does not cause visual distortion because the display is black. However, after the CRT has been on and the degaussing operation is manually initiated, a severely distorted picture is displayed to the user. Users may be alarmed by the level of distortion and thereby be discouraged from using the manual degaussing.

SUMMARY OF THE INVENTION

Accordingly, it is an object of the present invention to provide a degaussing method for a CRT, which overcome the problems encountered in a conventional degaussing method for a CRT.

It is another object of the present invention to provide an improved degaussing method for a CRT capable of preventing the display of visual distortion caused when a remaining magnetic field is manually degaussed in a state that the CRT is turned on.

To achieve the above objects, there is provided a degaussing method for a CRT, which includes the steps of; a first step which recognizes a state that control means performs a manual degaussing operation in accordance with a degaussing button operation; a second step in which when a degaussing operation is manually performed, a contrast control unit and a brightness control unit adjust the picture of a cathode ray tube (CRT) in accordance with a control of control means so that the picture becomes black; a third step in which a degaussing operation is performed with respect to the CRT in a state that the picture is black; and a fourth step in which the contrast unit and the brightness unit cause the picture of the CRT to return to the original state in accordance with a control of the control means after the degaussing operation is finished.

DETAILED DESCRIPTION OF THE INVENTION

Figure 1:
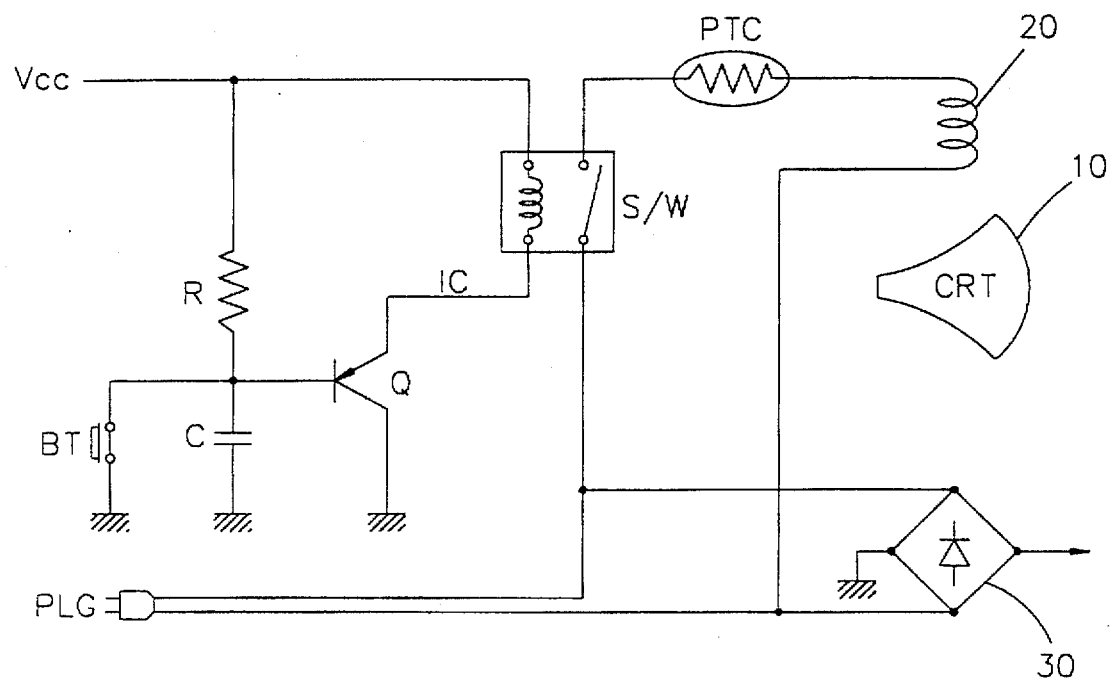
FIG. 1 is a circuit diagram of a CRT periphery circuit adopting a conventional degaussing method.
Figure 2A:
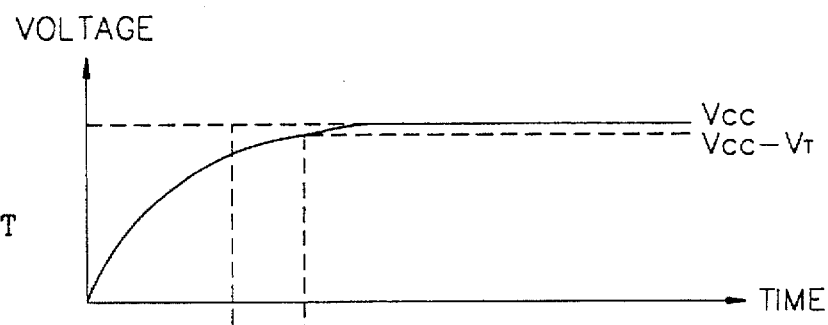
FIG. 2A is a wave form of voltage signal charged in a capacitance when voltage is supplied to a CRT of FIG. 1.
Figure 2B:
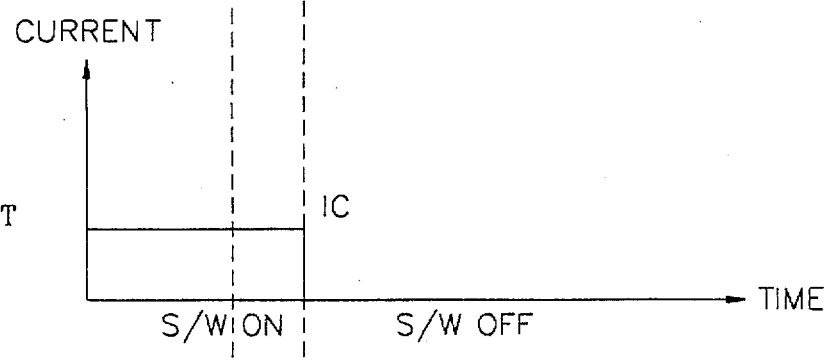
FIG. 2B is a wave form of current signal in a transistor when voltage is supplied to a CRT of FIG. 1.
Figure 2C:
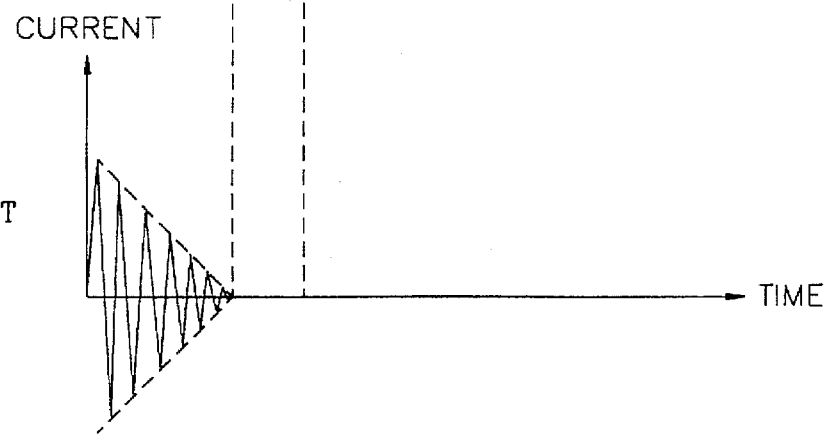
FIG. 2C is a wave form of current flowing to a degaussing coil when voltage is supplied to a CRT of FIG. 1.
Figure 3A:
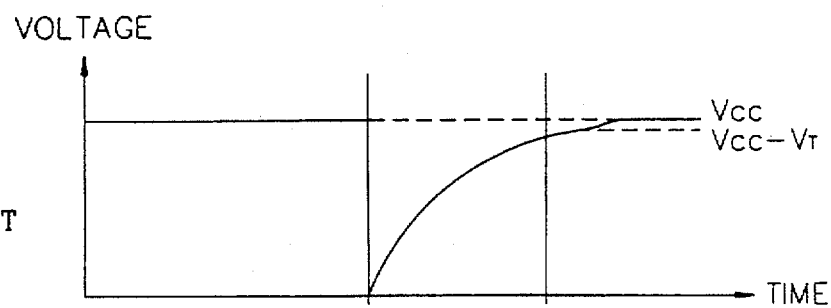
FIG. 3A is a wave form of voltage signal charged in a capacitance when remaining magnetic filed is manually degaussed.
Figure 3B:
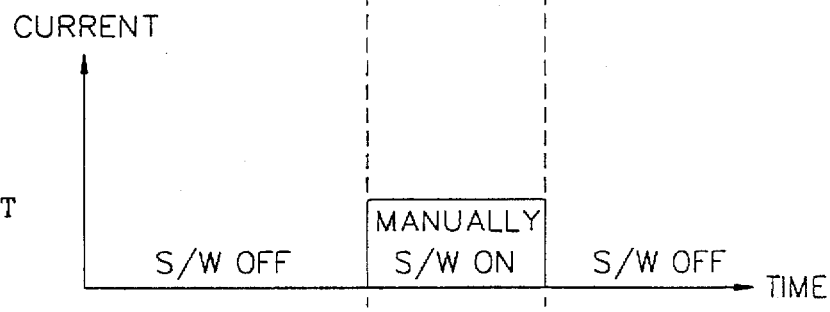
FIG. 3B is a wave form of current flowing to a transistor when remaining magnetic filed is manually degaussed.
Figure 3C:
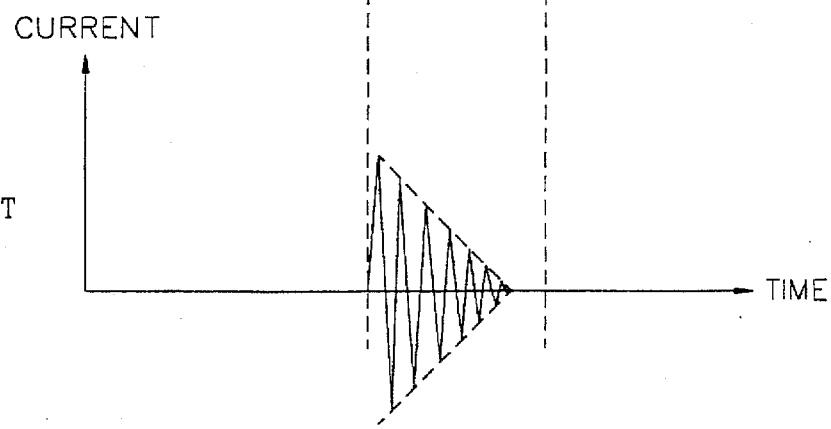
FIG. 3C is a wave form of current flowing to a degaussing coil when remaining magnetic field is manually degaussed.
Figure 4:
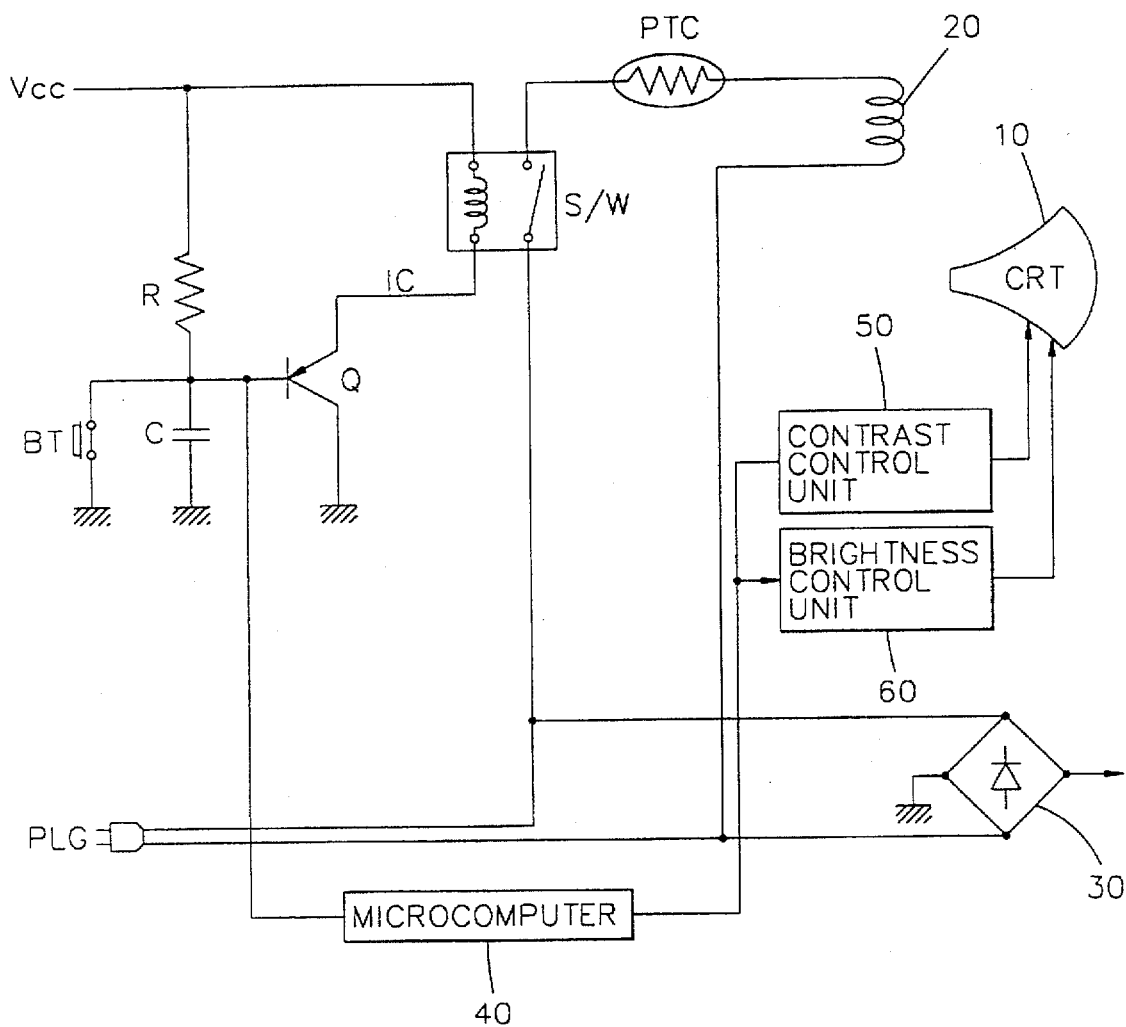
FIG. 4 is a circuit diagram of a CRT periphery circuit adopting a degaussing control method according to the present invention.

FIG. 4 shows a button BT, a capacitor C, a transistor Q, a switch S/W, a PTC, a degaussing coil 20, and a rectifier 30. In addition, a microcomputer 40 is commonly connected to the capacitor C and the base of the transistor Q for detecting the voltage level of the capacitor C. A contrast control unit 50 and a brightness control unit 60 are provided for controlling the contrast and brightness of a picture of the CRT 20 in accordance with a control of the microcomputer 40.

The operation and effects of the degaussing method for a CRT will now be explained with reference to FIG. 4.

To begin with, when the CRT is turned on, since voltage charged in the capacitor C is zero volt, the transistor Q is turned on, and a current Ic of the electric power Vcc flows to the collector of the transistor Q through the coil of the switch S/W, and the switch S/W is connected.

Thereafter, alternating current voltage is applied to the PTC and the degaussing coil 20 through an alternating current voltage plug PLG, and the CRT 10 is degaussed.

Thereafter, the capacitor C is charged due to the current applied thereto through a resistance R up to the level of the electric power Vcc, and the transistor Q is automatically turned off. Therefore, the switch S/W is disconnected, and the current is blocked from flowing to the PTC, and the degaussing coil 20 has no current voltage, so that the degaussing operation is stopped. In the above-mentioned state, when a user presses the button BT so as to degauss, the capacitor C is discharged, and the voltage of the capacitor C becomes a low level. Thereafter, the transistor Q is turned on, and the low level voltage caused due to the capacitor C is detected by the microcomputer 40.

Thereafter, the microcomputer 50 controls the contrast control unit 40 so that the contrast becomes the minimum level and controls the brightness control unit 60 so that the brightness becomes the minimum level all over the picture. Thereafter, the picture becomes a black state. At this time, the degaussing operation is performed in cooperation with the alternating current flowing to the coil 20, and no distortion is displayed to the user on the screen.

That is, the degaussing operation is performed in cooperation with the button BT, and the capacitor C is charged up to the level of the electric power Vcc, and the voltage of the charged capacitor C is detected by the microcomputer 40.

Thereafter, the microcomputer 40 controls the contrast control unit 50 and the brightness control unit 60 so that the contrast and brightness of a picture can be returned to the original state. The picture is returned to the original state.

Here, the microcomputer 40 can be substituted by a certain sensing device capable of detecting the level of voltage so as to implement the same purpose of the present invention.

As described above, the degaussing method for a CRT is directed to permitting the CRT picture to have a black state by detecting the level of voltage of a capacitor using a microcomputer and by controlling the contrast control unit and the brightness control unit to concurrently be the minimum level when manually performing the degaussing operation in a state that the CRT is turned on, so that there is no distortion caused due to the degaussing operation.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A system for degaussing a cathode ray tube (CRT) comprising:

a detector, including a microcomputer, operable to detect when a user has initiated a manual degaussing operation while the CRT is in an active state by sensing that a capacitor is in a discharged state;

a controller for adjusting a display of the CRT from the active state to a black state in accordance with the result of said detector so that visual effects caused by degaussing are not displayed to the user and for returning the CRT to the active state after degaussing; and a degaussing unit for degaussing the CRT while the CRT display is in the black state.

2. A system for degaussing according to claim 1, wherein said controller includes a contrast control unit for reducing contrast to a minimum when said detector determines that a manual degaussing operation has been initiated.

3. A system for degaussing according to claim 1, wherein said controller includes a brightness control unit for reducing brightness to a minimum when said detector determines that a manual degaussing operation has been initiated.

4. A system for degaussing according to claim 1, wherein said detector further determines that the manual degaussing operation is complete by sensing that a capacitor is in a charged state.

5. A system for degaussing according to claim 1, wherein the manual degaussing operation is initiated when the user presses a button.

6. A method for degaussing a cathode ray tube (CRT) comprising the steps of:

detecting, using a microcomputer, when a user has initiated a manual degaussing operation while the CRT is in an active state by sensing that a capacitor is in a discharged state;

adjusting the CRT display from the active state to a black state when it is detected that a user has initiated the manual degaussing operation so that visual effects caused by degaussing are not displayed to the user;

degaussing the CRT while the CRT display is in the black state; and returning the CRT to the active state after the degaussing step.

7. A method for degaussing a cathode ray tube according to claim 6, wherein said adjusting step is performed by reducing contrast to a minimum value.

8. A method for degaussing a cathode ray tube according to claim 6, wherein said adjusting step is performed by reducing brightness to a minimum value.

9. A method for degaussing according to claim 6, further comprising a second detecting step which determines that the manual degaussing operation is complete by sensing that a capacitor is in a charged state.

10. A method for degaussing a cathode ray tube according to claim 6, wherein the manual degaussing operation is initiated when the user presses a button.

* * * * *

UNITED STATES PATENT AND TRADEMARK OFFICE
CERTIFICATE OF CORRECTION

PATENT NO. : 5,742,127
DATED : April 21, 1998
INVENTOR(S) : Jong Ki AHN

It is certified that error appears in the above-identified patent and that said Letters Patent is hereby corrected as shown below:

On the title page, insert Item [73] to read as follows:

--LG Semicon Co., Ltd., Choongchungbook, Korea--

Signed and Sealed this

Fourth Day of May, 1999

*Attest:*

Q. TODD DICKINSON

*Attesting Officer*     *Acting Commissioner of Patents and Trademarks*